United States Patent [19]
Sesay

[11] Patent Number: 6,092,265
[45] Date of Patent: Jul. 25, 2000

[54] SEAT BELT

[76] Inventor: Peter Sesay, 61 Dorchester House, 228 Great Western Road, London, United Kingdom, W11 1BE

[21] Appl. No.: 09/294,473

[22] Filed: Apr. 20, 1999

[30] Foreign Application Priority Data

Apr. 21, 1998 [GB] United Kingdom .................... 9808454
Jan. 18, 1999 [GB] United Kingdom .................... 9901054

[51] Int. Cl.[7] ........................... A44B 11/02; A44B 11/18; A62B 35/00
[52] U.S. Cl. ................. 24/200; 24/197; 24/198; 24/532
[58] Field of Search .............. 24/200, 198, 197, 24/196, 532, 633; 297/476, 481

[56] References Cited

U.S. PATENT DOCUMENTS

| | | | |
|---|---|---|---|
| 416,480 | 12/1889 | Mayer | 24/200 |
| 1,589,228 | 6/1926 | Robb | 24/532 |
| 2,212,862 | 8/1940 | Hirsh | 24/200 |
| 2,984,879 | 5/1961 | Budd et al. | 24/532 |
| 4,236,755 | 12/1980 | Pollitt et al. . | |
| 4,540,218 | 9/1985 | Thomas | 24/198 |
| 4,637,099 | 1/1987 | Kasai . | |
| 5,042,838 | 8/1991 | Carter . | |
| 5,088,161 | 2/1992 | Robertson . | |
| 5,154,446 | 10/1992 | Blake . | |
| 5,201,099 | 4/1993 | Campbell . | |

FOREIGN PATENT DOCUMENTS

| | | | |
|---|---|---|---|
| 0 465 033 | 1/1992 | European Pat. Off. . | |
| 0465033 | 1/1992 | European Pat. Off. | 24/200 |
| 0333225 | 11/1903 | France | 24/200 |
| 0515124 | 3/1921 | France | 24/200 |
| 1409819 | 7/1965 | France | 24/196 |
| 94 18 273 | 3/1995 | Germany . | |
| 1 480 012 | 7/1977 | United Kingdom . | |
| 2 015 321 | 9/1979 | United Kingdom . | |
| 2 208 468 | 4/1989 | United Kingdom . | |
| 2 230 938 | 11/1990 | United Kingdom . | |
| WO 95/09547 | 4/1995 | WIPO . | |
| WO 97/36522 | 10/1997 | WIPO . | |

*Primary Examiner*—Victor N. Sakran
*Attorney, Agent, or Firm*—Flynn, Thiel, Boutell & Tanis, P.C.

[57] ABSTRACT

A buckle, for example a seat belt buckle, is disclosed for guiding two belt runs. The buckle 40 comprises a first passage for a first belt and a second passage for a second belt, the two passages meeting at a meeting region. The second passage has its width from side to side greater than its thickness from top to bottom and is provided with an opening 41 through which the second belt may be easily inserted into or removed from the second passage.

9 Claims, 2 Drawing Sheets

SEAT BELT

When a standard seat belt is used by a small person such as a child, difficulties may be encountered because parts of the body of the small person are in different places from the corresponding parts of the standard-size person. The diagonal part of the belt which passes across the chest of the normal-size person might well pass across the face of a small-size person.

A known solution to this problem is to mount a buckle through which the standard seat belt passes at the upper region of the diagonal portion, the buckle being mounted on a separate belt loop which is secured to the back squab of the seat. The buckle can be moved vertically on the separate belt loop to adjust the angle of the diagonal portion of the standard belt according to the height of the user. The problem with this solution is that the standard belt has to pass through the buckle and so the standard belt must have one end disconnected from its anchoring point to be passed through the buckle which may involve unstitching the lug connecting the end of the belt to the anchoring point if the lug itself is too large to pass through the slots of the buckle. Not only is this disconnection and re-connection inconvenient, it may be done by inexpert persons leading to subsequent failure of the belt.

A buckle has been proposed into which a belt can be introduced sideways rather than lengthways, by means of a slot which is aligned with the centre-line of the length of the belt. The slot is sometimes protected by a clip or hinged cover. This arrangement avoids the disconnection problems, but still involves a difficult operation for inserting the standard belt into the buckle and the slot on the face of the buckle is an inherent weakness and the addition of the clip or cover is a complication.

The present invention overcomes this problem by providing a special buckle into which a belt strip can be introduced transversely of its length without folding the belt. According to the invention there is provided a buckle for guiding two belt runs comprising a first passage for the first belt, a second passage for the second belt, the two passages meeting in a meeting region, the second passage having its width from side to side greater than its thickness from top to bottom and being provided with an opening. Preferably the opening opens into the second passage from a direction inclined to the plane of the belt when running through the second passage. The first passage preferably comprises two apertures side by side in a base plate of the buckle. The second passage is preferably inclined between a base plate and a top plate and the top plate is preferably inclined at a small angle to the base plate such that the thickness of the second passage is greater adjacent the opening. A lip may be provided on the buckle adjacent the side opening and this lip is preferably formed as an extension of the bottom plate.

The opening is preferably located adjacent to one side of the second passage. The position of the opening at the side has the distinct advantage of allowing insertion or removal of the seat belt with very little effort which does not necessitate scrunching or folding of the webbing, while still retaining the seat belt until you wish to remove it. The seat belt is removed with ease by curving the edge of the seat belt and sliding it through the opening without scrunching.

An example of the prior art and of the invention will now be described with reference to the accompanying drawings in which.

Figure 2:
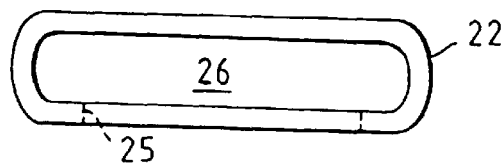
FIG. 2 is a transverse cross-section through a prior art buckle.
Figure 3:
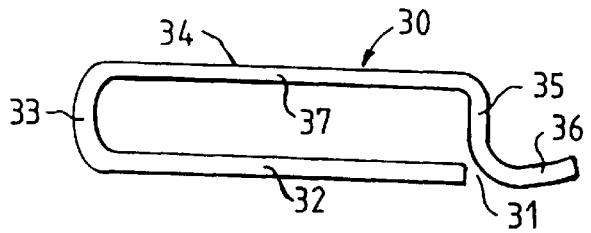
Figure 4:
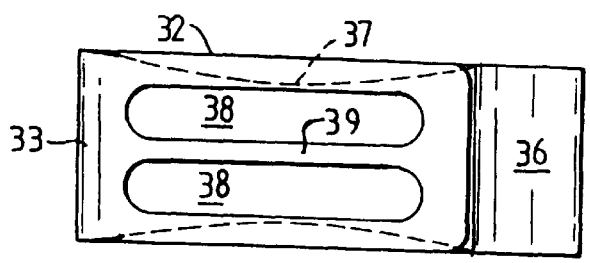
Figure 5:
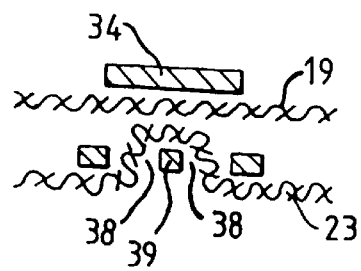
Figure 6:
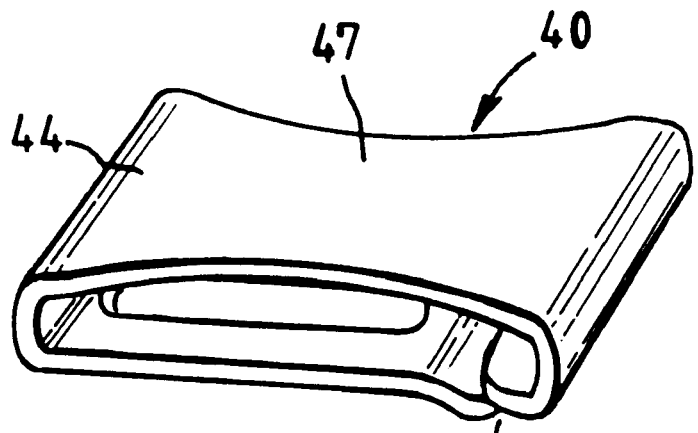
Figure 7:
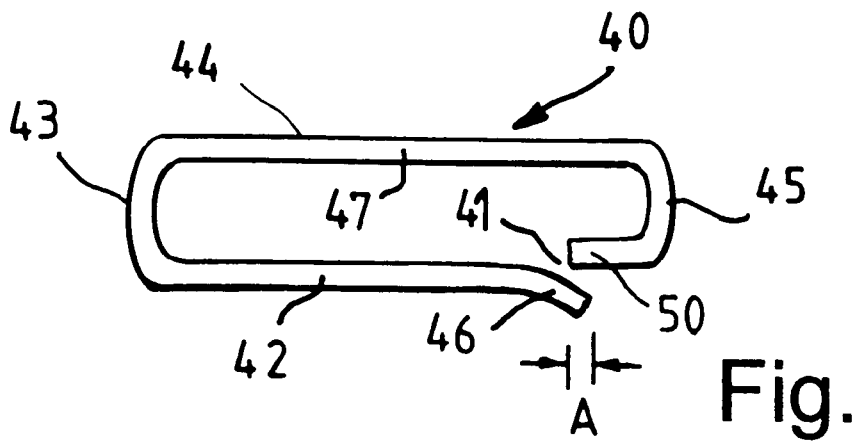
Figure 8:
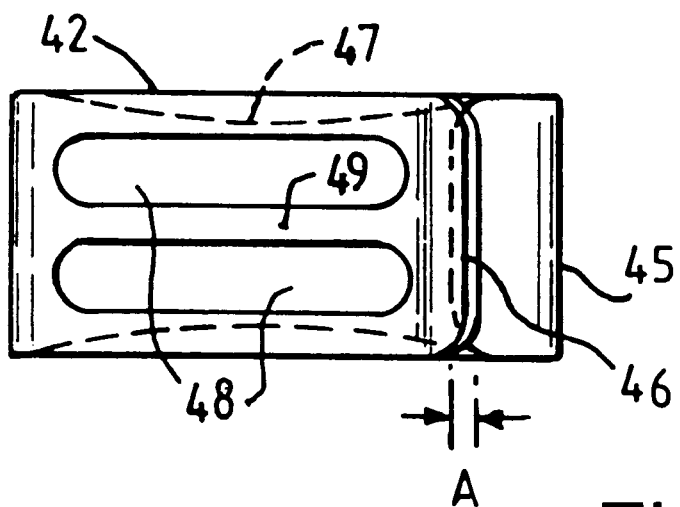

FIG. 3 is a transverse cross-section corresponding to the section of FIG. 2 of a first embodiment of the invention, FIG. 4 is an underplan of the embodiment of FIG. 3, FIG. 5 is a cross-section through the embodiment of FIG. 3 in lines 5—5, FIG. 6 is a perspective view of a buckle according to a second embodiment of the invention, FIG. 7 is a transverse cross-section through the buckle of FIG. 6, and FIG. 8 is an underplan of the buckle of FIG. 6.

Figure 1:
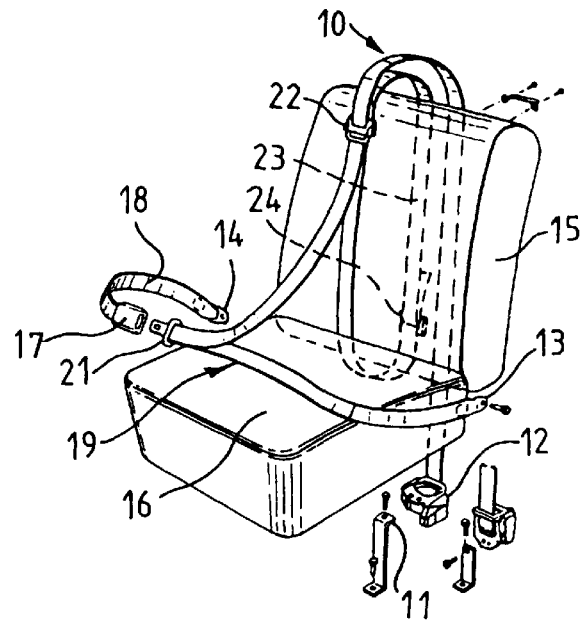
FIG. 1 is a diagram of a prior art belt adjustment system.

In the prior art arrangement of FIG. 1, the conventional seat belt 10 has an anchoring point 11 with a retracting mechanism 12 located behind the seat and a simple anchoring point 13,14 located on either side of the seat adjacent the hinge between the back squab 15 and the seat squab 16. The fixing clip 17 of the seat belt is secured to a short fixed length 18 of webbing to one of the side anchoring points 14 and the main length 19 of the belt runs from the other side fixing point 13 through the tongue 21 which can be secured to the clip 17 to restrain the user up through a secondary buckle 22 and over the top of the seat squab to the anchoring point 11 with the retracting mechanism 12. The additional buckle 22 is mounted on a secondary loop 23 of webbing which is secured around the back seat squab in a vertical plane by a third buckle 24 through which the loop can be pulled tight to grip the back seat squab 15. The secondary buckle has a lower passageway 25 for the secondary belt loop and an upper passageway 26 for the main belt, both passageways being closed so that the lengths of belt can only be inserted longitudinally which means that the main belt has to be passed through the upper passageway before any bulky components are secured to it. Although this is not a serious limitation when the main seat belt and secondary belt loop are being newly assembled in a factory, it is a problem when it is desired to add the secondary belt loop and its buckles to a main seat belt already installed in a vehicle.

It will be seen from FIG. 2 that the transverse section through the buckle is a closed loop. In contrast, the transverse section through the buckle 30 according to a first embodiment of the invention is an open loop with its opening 31 at one side, so that a flexible length of webbing can be introduced into the loop sideways through the opening. The plate which forms the buckle of FIG. 3 has a flat base portion 32 curving round at one end 33 to a top portion 34 extending generally parallel to the base, but inclined slightly so that its distance from the base increases with distance from this one end 33. At the other end 35 the top portion bends downwards to a point slightly beyond the end of the base thereby defining the opening 31 to the loop, which opening is in the plane of the base. The free end of the top portion is formed with a lip 36 rising a little above the plane of the base. The lip forms a useful handle for adjusting the position of the buckle on one of the belt runs. The distance between the end 33 of the buckle and the opening 31 is substantially the same as the width of the belt.

From the dashed lines in FIG. 4 it will be seen that the central region 37 of the top portion has a waist which is narrower than the uniform width of the base portion and than the equal width of the lip. The base portion 32 has two apertures 38 therethrough one on either side of a central bar 39, through which the secondary belt run 23 is fed as shown in the section of FIG. 5. The main belt 19 runs below the top portion in an approximate straight line and over the "hump" of the second belt passing over the centre bar 39 of the base portion.

The function of the buckle 30 is not so much to prevent relative longitudinal motion of the two runs 19,23 of belt (as does the conventional buckle on a trouser belt) but to hold the main belt run 19 on to the line of the secondary belt 23. Since the main belt passes in the diagonal direction below the buckle as shown in FIG. 1, it is better that the lip 36 of the buckle should face away from that diagonal direction so that any pull on the main belt presses it against the closed one end of the buckle and does not cause the main belt to escape through the opening 31 as it might if the buckle were reversed (in spite of the opening being located below the level of the main belt in the buckle).

When a seat belt assembly is to be installed with the buckle 30 of FIGS. 3 to 5 substituted for the buckle 22 of FIG. 1, the buckle 30 is fed onto the free end of the secondary belt length 23, the secondary belt length passing through the apertures 38 and over the central bar 39. The lip 36 of the buckle faces to the right in the arrangement of FIG. 1. The free end of the secondary belt length is pulled through its other buckle 24 around the back squab 15 of the seat so that the secondary belt length lies in a vertical plane towards the right hand side of the seat. The conventional seat belt 19 can be used for a standard adult independently of the buckle 30 and secondary belt length 23, but when the seat belt 19 is to be used for a small person, the upper portion of the diagonal extent of the main seat belt is slipped into the buckle 30 through the opening 31. The buckle 30 is moved on the secondary belt length loop 23 secured around the back squab 15 until the buckle 30 is at the height just above shoulder level of the intended user. The buckle 30 then guides the seat belt from the shoulder, while being able to move up and down the secondary belt loop 23 to give height adjustment to passengers with ease. This will ensure the diagonal extent of the belt will end at the appropriate height. The buckle 30 will not inhibit the user pulling the diagonal extent of the belt forwards when he or she wishes to reach forwards from the seat since the buckle 30 only inhibits sideways movement of the main belt and leaves its longitudinal movement free. When the buckle 30 is looped onto the secondary belt 23 it can be angled to suit then contour of the upper diagonal portion of the main belt run 19, thus allowing the main belt run 19 to retract freely.

FIGS. 6 to 8 illustrate a second embodiment of the invention which is generally similar to the first embodiment, although it differs in the design of the opening.

The transverse section through the buckle 40 of the second embodiment is an open loop with its opening 41 in the base portion 42 of the buckle. A flexible length of webbing can be introduced into the loop sideways through the opening 41. The buckle 40 also includes a curved side portion 43 and a generally flat top portion 44 extending generally parallel with the base, but inclined slightly so that its distance from the base increases the distance from the side portion 43. At the side 45 opposite the side portion 43, the buckle is also curved. The opening 41 in the base portion 42 is formed adjacent this second side portion 45.

The opening 41 includes a lip 46 which extends from the base portion 42 in a direction generally towards the second side portion 45 but inclined downwards. The lip 46 overlaps the portion 50 of the base portion 42; which is formed continuously with the second side portion 45, by approximately 1 to 3 mm (designated A in the figures). The distance between the side portion 43 of the buckle and the opening 41 is substantially the same as the width of the belt.

In common with the first embodiment, the central region 47 of the portion of the buckle has a waist which is narrower than the uniform width of the base portion.

The base portion 42 has two apertures 48 therethrough, one on either side of a central bar 49, through Which the secondary belt run is fed. The main belt runs below the top portion in an approximate straight line over the "hump" over the secondary belt passing over the second bar 49 of the base portion. Thus, the arrangement of the belts of the second embodiment is the same as that illustrated in FIG. 5, which refers to the first embodiment.

The function of the buckle 40 of the second embodiment is generally the same as the buckle of the first embodiment, and it is installed in generally the same manner. However, the second embodiment is thought to ease the insertion and removal of the main belt from the buckle 40, without compromising the safety of the buckle.

The embodiments described are employed with a standard size car seat belt.

What is claimed is:

1. A buckle for guiding two belt runs, comprising a first passage for the first belt run to extend through said buckle, a second passage for the second belt run to extend through said buckle, the two passages meeting in a meeting region, the second passage having a width from side to side greater than its thickness from top to bottom and being provided with an opening adjacent to one side such that the second belt run can be introduced into the second passage without folding, the parts of the buckle which define the opening overlapping each other, and a lip being provided on the buckle adjacent and extending away from the opening to assist in the insertion of the second belt run.

2. A buckle according to claim 1, wherein the opening opens into the second passage from a direction inclined to the plane of the belt when running through the second passage.

3. A buckle according to claim 1, wherein the first passage comprises two apertures side by side in a base plate of the buckle.

4. A buckle according to claim 1, wherein the second passage is inclined between a base plate and a top plate and the top plate is preferably inclined at a small angle to the base plate such that the thickness of the second passage is greater adjacent the opening.

5. A buckle according to claim 4, wherein said lip is an extension of the base plate.

6. A buckle according to claim 1, wherein the opening is positioned such that, in use, the second belt is urged away from the opening when the second belt acts as a restraint.

7. A buckle for joining first and second seat belts to correctly position a shoulder belt across a person seated in a seat, the first seat belt having a fixed first end and a second end fixed to a retractor device, the first seat belt having a tongue intermediate the first and second ends and removably fixed to a fixed clip so that the first belt defines a waist belt extending across a waist of a person and the shoulder belt extending diagonally across the chest and shoulder of a person, the second belt extending vertically over a seat back, said buckle comprising:

a top wall;

first and second side walls extending transversely from opposite sides of said top wall;

a first bottom wall cantilevered to said first side wall, a substantial portion of said bottom wall extending generally parallel to said top wall, a free end of said first bottom wall defining a lip extending away from said top wall, said first bottom wall including first and second apertures therein which are separated by a central bar, the second seat belt extending into said first aperture over said central bar and through said second aperture whereby said buckle is selectively positionable on the second seat belt;

a second bottom wall cantilevered to said second side wall, said second bottom wall being shorter than said first bottom wall, a free end of said second bottom wall being spaced from and overlapping said lip so as to create an opening adjacent said second side wall intermediate both said free ends, said opening receiving the first seat belt sidewardly therethrough without folding the same; and a through space enclosed by said top, first bottom, second bottom, first side, and second side walls for slidably receiving the shoulder belt after it is inserted sidewardly without folding through said opening into said through space, said through space being wider between said side walls than between said top and first and second bottom walls, whereby the position of the shoulder belt can be adjusted by moving said buckle containing the first belt along the second belt.

8. A buckle according to claim 7, wherein said through space extends substantially perpendicular to said first and second apertures, said first and second apertures open into said through space so that the first and second belts extend in a same direction through the buckle, and the second belt as it passes over said central bar is directly adjacent a portion of the first belt extending in said through space.

9. A buckle according to claim 7, wherein said top wall is enlarged in a plane and a front edge of said top wall is arcuate.

* * * * *